(12) United States Patent
Snavely

(10) Patent No.: US 8,998,422 B1
(45) Date of Patent: Apr. 7, 2015

(54) SYSTEM AND METHOD FOR DISPLAYING CONTROL ROOM DATA

(71) Applicant: William J. Snavely, Melbourne, FL (US)

(72) Inventor: William J. Snavely, Melbourne, FL (US)

(*) Notice: Subject to any disclaimer, the term of this patent is extended or adjusted under 35 U.S.C. 154(b) by 134 days.

(21) Appl. No.: 13/784,854

(22) Filed: Mar. 5, 2013

Related U.S. Application Data

(60) Provisional application No. 61/606,921, filed on Mar. 5, 2012.

(51) Int. Cl.
G03B 21/26 (2006.01)
H04N 9/31 (2006.01)

(52) U.S. Cl.
CPC ........................................ *H04N 9/31* (2013.01)

(58) Field of Classification Search
CPC ....... G06F 3/1415; G06F 3/1423; G06F 3/54; G06F 3/4443; G06F 17/30241; G06F 17/30306; G06F 17/30368
USPC ........... 353/30, 31, 69, 70, 85, 119, 121, 122, 353/28; 715/775, 769, 810, 835, 764, 757, 715/202, 203, 730; 348/14.01, 143, 207.1, 348/743–747; 707/705, 713
See application file for complete search history.

(56) References Cited

U.S. PATENT DOCUMENTS

| | | | | |
|---|---|---|---|---|
| 7,699,476 | B2 * | 4/2010 | Denoue et al. | 353/122 |
| 8,560,946 | B2 * | 10/2013 | Fugitt et al. | 715/700 |
| 2002/0038462 | A1 * | 3/2002 | Sakakibara et al. | 725/151 |
| 2008/0148175 | A1 * | 6/2008 | Naaman et al. | 715/781 |
| 2010/0241944 | A1 * | 9/2010 | Athsani et al. | 715/230 |
| 2010/0332959 | A1 * | 12/2010 | Mitchell et al. | 715/202 |
| 2012/0069131 | A1 * | 3/2012 | Abelow | 348/14.01 |
| 2012/0133911 | A1 * | 5/2012 | Laduke | 353/121 |

* cited by examiner

*Primary Examiner* — Sultan Chowdhury
(74) *Attorney, Agent, or Firm* — Lech Law, LLC; Robert R. Lech

(57) ABSTRACT

Systems, devices and methods for displaying control room data are disclosed. In some embodiments, the systems, devices and methods are employed by operators of infrastructure to depict the status of the infrastructure to provide situational awareness to the operators.

18 Claims, 3 Drawing Sheets

SYSTEM AND METHOD FOR DISPLAYING CONTROL ROOM DATA

CROSS-REFERENCE TO RELATED APPLICATIONS

This application claims priority to U.S. Provisional Patent Application Ser. No. 61/606,921 filed Mar. 5, 2011 entitled "System and Method for Displaying Control Room Data," which is incorporated by reference in its entirety as if fully set forth herein.

TECHNICAL FIELD

The present application generally relates to presenting static and dynamic control room data. More specifically, the present application relates to systems, devices and methods for presenting dynamic information overlaid over static information.

STATEMENT REGARDING FEDERALLY SPONSORED RESEARCH

No government monies were used in the development of the subject matter of this application.

BACKGROUND

Operators of infrastructure, particularly critical infrastructure such as utilities, including power, gas and water, government facilities, or telecommunications networks strive to maintain uninterrupted access to an overview of their scope of responsibility to maintain situational awareness. Such overviews, sometimes referred to as mapboards, are often presented as large maps or network diagrams.

Such diagrams may be drawn on fixed surfaces; displayed via one or more video displays; or projected upon a surface such as a screen or wall from the front or rear. Fixed surface presentations are economical and reliable, but do not reflect the current actual state of the critical infrastructure. Video display presentations, including the use of monitors and projectors, may reflect the current actual state, but they are expensive, and they can experience failures that leave situational awareness overviews unavailable.

Accordingly, there is a need for effective systems, devices and methods that present an economical, reliable, up-to-date view of information related to critical infrastructure.

SUMMARY

According to a first aspect of the present application, an example system is disclosed for displaying data. The example system comprises a display device comprising a display surface. The display surface comprises a static image of infrastructure. The example system further comprises a visualization server. The visualization server collects information concerning the infrastructure and processes the collected information to determine at least one display status representing a status of at least a portion of the infrastructure. The example system still further comprises a projector in communication with the visualization server. The projector receives an electronic image of the display status from the visualization server and projects the image of the display status onto the static image of the infrastructure on the display surface.

According to a second aspect of the present application, an example method is disclosed for displaying data. The example method comprises providing a static image of infrastructure on a display surface. The example method further comprises collecting, by a visualization server, information concerning the infrastructure. The example method still further comprises processing the information to determine at least one display status representing a status of at least a portion of the infrastructure, and transmitting an electronic image of the display status to a projector. The example method yet further comprises projecting the image of the display status onto the static image of the infrastructure on the display surface

BRIEF DESCRIPTION OF THE DRAWINGS

The accompanying figures, which are incorporated in and constitute a part of the specification, illustrate various example systems, devices methods, and so on, and are used merely to illustrate various example embodiments. It should be noted that various components depicted in the figures may not be drawn to scale, and that the various assemblies and designs depicted in the figures are presented for purposes of illustration only, and should not be considered in any way as limiting.

DRAWING REFERENCE NUMERALS

Figure 1:
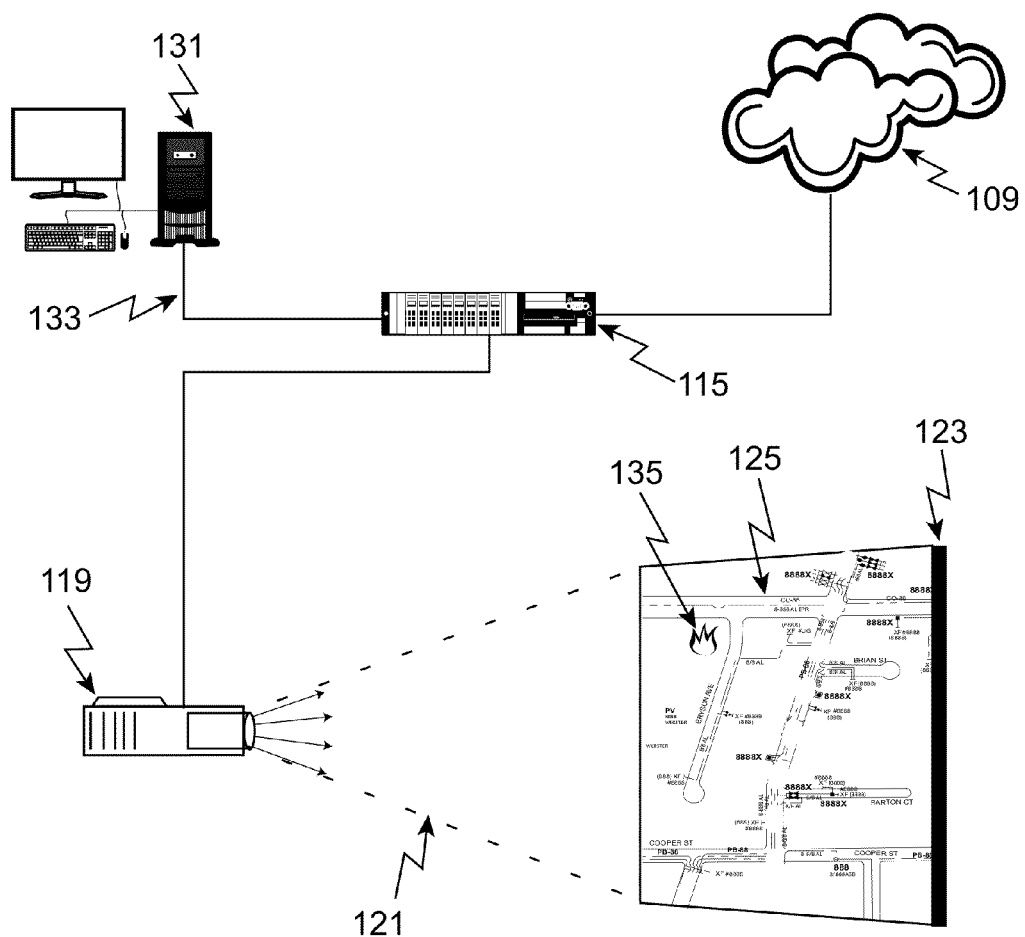
FIG. 1 is a schematic block diagram illustrating an example embodiment of the systems, devices and methods of the present application.

The following reference characters identify the associated elements depicted in the drawings describing the present invention.

| | | | |
|---|---|---|---|
| 109 | Real-time information source(s) | 211 | Display surface |
| 115 | Visualization server software | 213 | Colorized symbols |
| 119 | Video projector | 215 | Halo |
| 121 | Projected dynamic electronic image | 217 | Colorized shadow |
| 123 | Display surface | 219 | Blinking disc |
| 125 | Static image | 221 | Dashed lines |
| 129 | Display status | 223 | Filled shape |
| 131 | Operator computer | 300 | Example methodology |
| 133 | Operator directives | 310-350 | Method elements |
| 135 | Electronic pushpin | | |

DETAILED DESCRIPTION

A hybrid control room mapboard is disclosed herein as a combination of hardware and software that overlays a fixed or static presentation of a control room's scope of responsibility with a dynamically updated presentation of the current state of the associated infrastructure.

In one embodiment, a fixed presentation of an electric utility control room's scope of responsibility (the "static image") is embodied as a diagram of the lines and substations that make up an electric power system. Similarly, a telecommunications network might similarly be embodied as a diagram of routing devices and network cabling that make up the network.

Computer hardware executing software called a visualization server periodically collects data concerning the current state of the infrastructure components, such as breakers and switches of an electric utility, by interrogating the computer systems that monitor and control the infrastructure. Calculations and/or rules within the visualization server may determine how the current state of each device should be shown. For example, excessive voltage on a power line might be indicated by flashing. A router on a telecommunications network that is out of service might be indicated by a blinking image of the router.

The visualization server transmits an electronic image of the current state of the infrastructure to a video projector, which overlays the static image with dynamic video content.

Additionally, operators may place electronic notes and/or push-pins on the Electronic Image to provide additional data for each other.

Referring to FIG. 1, a schematic block diagram illustrates an example embodiment of a display device, or more specifically, a hybrid control room mapboard. A new or existing display surface area 123 is covered with a static image 125. The static image may comprise a completely static presentation such as a drawing, or the static image may comprise a partially static presentation such as a mapboard with embedded indicators. Although the mapboard 123 is illustrated as a single display surface, in an alternate embodiment the mapboard may be a modular display device comprising a plurality of contiguous display surfaces forming a larger display area.

A dynamic electronic image 121 corresponding to the static image 125 is created on the visualization server 115. In the illustrated embodiment, the dynamic electronic image 121 has the same general dimensions and shape as the static image 125. The dynamic electronic image 121 may be projected onto the static image 125 using a video projector 119. The video projector 119 may be positioned and aligned to ensure that the electronic image 121 is aligned with the static image 125.

With continuing reference to FIG. 1, one or more sources of real-time information 109 may be periodically collected by the visualization server software 115. Calculations may be performed in the visualization server 115 that refine the real-time information 109 and identify situations that will be represented by the dynamic electronic image 121. The visualization server 115 updates the dynamic electronic image 121 with dynamic symbols and/or color patterns that are aligned with the static image 125 and convey topical information based on the processing performed in the visualization server software 115.

As also depicted in FIG. 1, operators may employ a computer 131 to convey operator directives 133 to the visualization server 115, which result in the placement of electronic pushpins and/or notes 135 on the mapboard display surface 123.

Figure 2:
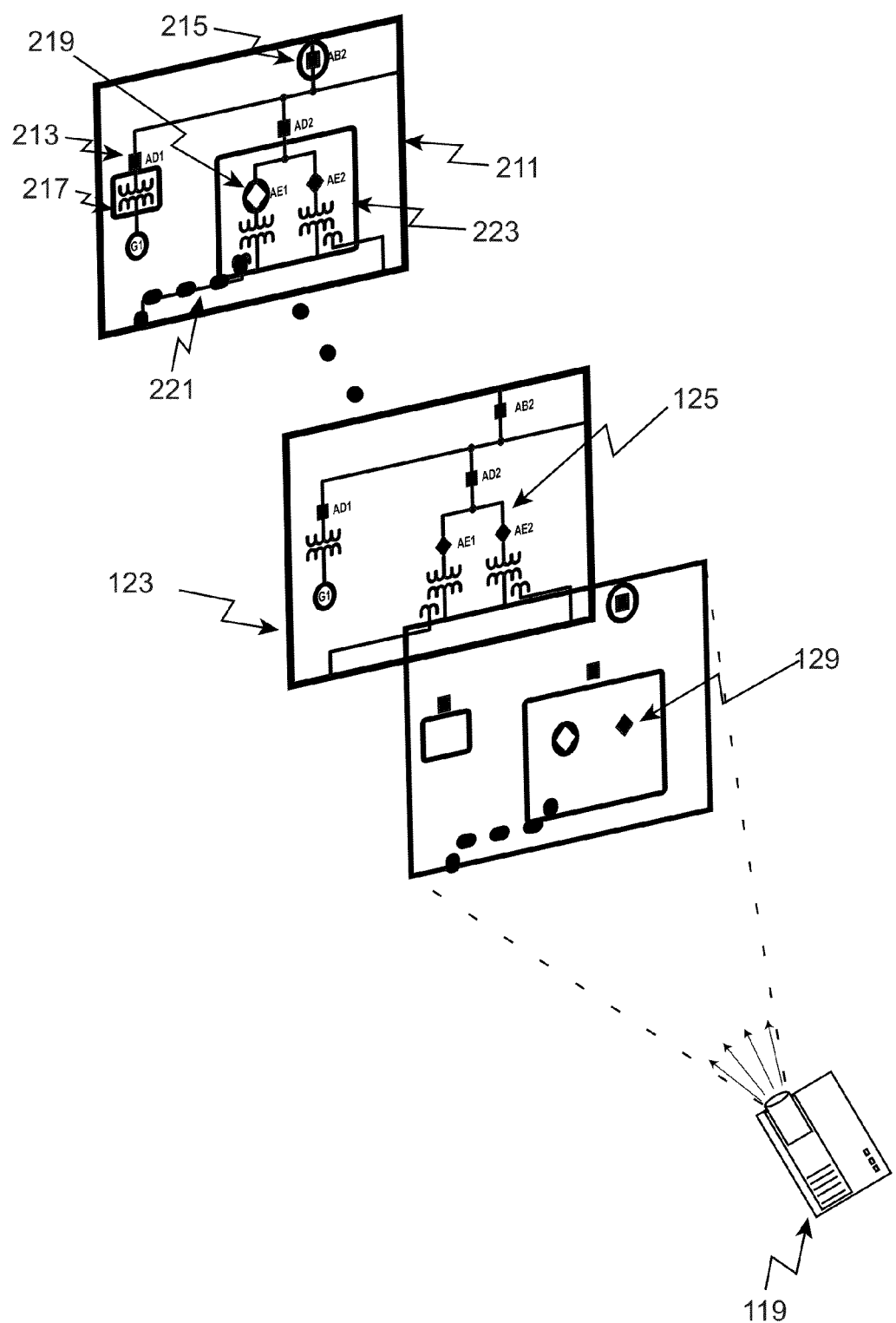
FIG. 2 is an exploded schematic block diagram illustrating elements of a display produced by the example embodiment of FIG. 1.

Referring now to FIG. 2, an exploded schematic block diagram illustrates elements of a display produced by the example embodiment of FIG. 1.

Video Projector 119 projects dynamic image 121 comprising display status 129 onto a new or existing surface area 123 that is covered with at least a partially static graphical image 125. Display surface 123 is often called a mapboard.

The display status 129 may comprise any of a number of visualization techniques to depict an operating condition and/or state. For example, visualization techniques may include colorized symbols 213 that reflect the current state of objects, halos 215 that reflect the pedigree of objects, colorized shadows 217 that reflect a real-time condition of an object, blinking discs 219 that reflect an object in an alarm condition, dashed lines 221 that move along a path to reflect a direction of motion, and a filled shape 223 that strobes to represent a stressed area of a system.

Figure 3:
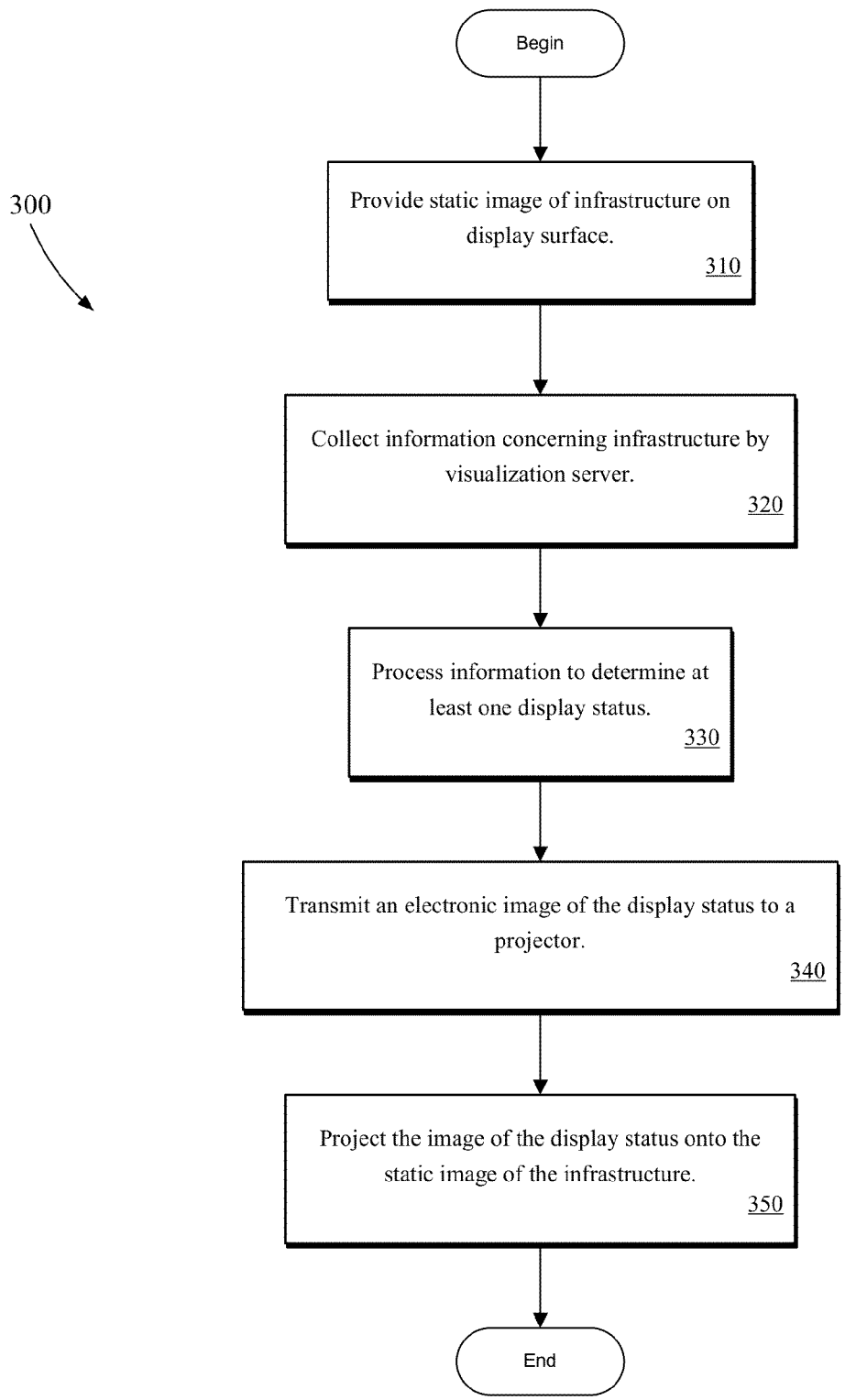
FIG. 3 is a flowchart illustrating elements of one example method for displaying data.

Referring now to FIG. 3, an example methodology 300 illustrates elements of a method for displaying data. As shown, at block 310 a static image of an infrastructure is provided on a display surface. A visualization server collects information concerning the infrastructure at block 320. The visualization server processes the information at block 330 to determine at least one display status. At block 340, the visualization server transmits an electronic image of the display status to a projector; and at block 350, the projector receives the image and projects the image of the display status onto the display surface comprising the static image of the infrastructure.

While the systems, methods, and so on have been illustrated by describing examples, and while the examples have been described in considerable detail, it is not the intention of the applicant to restrict, or in any way, limit the scope of the appended claims to such detail. It is, of course, not possible to describe every conceivable combination of components or methodologies for purposes of describing the systems, methods, and so on provided herein. Additional advantages and modifications will readily appear to those skilled in the art. Therefore, the invention, in its broader aspects, is not limited to the specific details and illustrative examples shown and described. Accordingly, departures may be made from such details without departing from the spirit or scope of the applicant's general inventive concept. Thus, this application is intended to embrace alterations, modifications, and variations that fall within the scope of the appended claims. The preceding description is not meant to limit the scope of the invention. Rather, the scope of the invention is to be determined by the appended claims and their equivalents.

Finally, to the extent that the term "includes" or "including" is employed in the detailed description or the claims, it is intended to be inclusive in a manner similar to the term "comprising," as that term is interpreted when employed as a transitional word in a claim. Furthermore, to the extent that the term "or" is employed in the claims (e.g., A or B) it is intended to mean "A or B or both." When the applicants intend to indicate "only A or B, but not both," then the term "only A or B but not both" will be employed. Similarly, when the applicants intend to indicate "one and only one" of A, B, or C, the applicants will employ the phrase "one and only one." Thus, use of the term "or" herein is the inclusive, and not the exclusive use. See Bryan A. Garner, A Dictionary of Modern Legal Usage 624 (2d. Ed. 1995).

What is claimed is:

1. A system for displaying data, the system comprising:
    a display device comprising a display surface, the display surface comprising a static image of an infrastructure;
    a visualization server, the visualization server collecting information concerning the infrastructure, the visualization server further processing the collected information to determine at least one display status representing a status of at least a portion of the infrastructure; and
    a projector in communication with the visualization server, the projector receiving an electronic image of the display status from the visualization server, the projector further projecting the image of the display status onto the static image of the infrastructure on the display surface.

2. The system of claim 1 wherein the display device comprises a modular display device.

3. The system of claim 1 wherein the display device comprises non-projected dynamic indicators on the display surface.

4. The system of claim 1 wherein the image of the display status comprises a colorized symbol.

5. The system of claim 1 wherein the image of the display status comprises a halo.

6. The system of claim 1 wherein the image of the display status comprises a shadow.

7. The system of claim 1 wherein the image of the display status comprises a blinking image.

8. The system of claim 1 wherein the image of the display status comprises a dashed line.

9. The system of claim 1 wherein the image of the display status comprises a motion video presentation.

10. A method for displaying data, the method comprising:
    providing a static image of infrastructure on a display surface;
    collecting, by a visualization server, information concerning the infrastructure;
    processing the information to determine at least one display status representing a status of at least a portion of the infrastructure;
    transmitting an electronic image of the display status to a projector; and
    projecting the image of the display status onto the static image of the infrastructure on the display surface.

11. The method of claim 10 wherein the display surface is a modular display surface.

12. The method of claim 10 further comprising providing non-projected indicators on the display surface.

13. The method of claim 10 wherein the image of the display status comprises a colorized symbol.

14. The method of claim 10 wherein the image of the display status comprises a halo.

15. The method of claim 10 wherein the image of the display status comprises a shadow.

16. The method of claim 10 wherein the image of the display status comprises a blinking image.

17. The method of claim 10 wherein the image of the display status comprises a dashed line.

18. The method of claim 10 wherein the image of the display status comprises a motion video presentation.

* * * * *